US011119020B2

(12) United States Patent
Neumann Barros Ferreira et al.

(10) Patent No.: US 11,119,020 B2
(45) Date of Patent: Sep. 14, 2021

(54) DETERMINING WETTABLITY CHARACTERISTICS OF A FLUID-FLUID-SOLID SAMPLE

(71) Applicant: International Business Machines Corporation, Armonk, NY (US)

(72) Inventors: Rodrigo Neumann Barros Ferreira, Rio de Janeiro (BR); Michael Engel, Rio de Janeiro (BR); Mathias B. Steiner, Rio de Janeiro (BR); Ronaldo Giro, Rio de Janeiro (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 73 days.

(21) Appl. No.: 16/515,102

(22) Filed: Jul. 18, 2019

(65) Prior Publication Data

US 2021/0018417 A1    Jan. 21, 2021

(51) Int. Cl.
*G01N 13/00*    (2006.01)

(52) U.S. Cl.
CPC .................................. *G01N 13/00* (2013.01)

(58) Field of Classification Search
CPC .. G01N 13/00; B01L 3/502792; G02B 26/005
See application file for complete search history.

(56) References Cited

U.S. PATENT DOCUMENTS

| 7,560,372 B2 | 7/2009 | Tomimori et al. |
| 9,016,111 B2 | 4/2015 | Stukan et al. |
| 2018/0353433 A1 | 12/2018 | Tuteja et al. |

FOREIGN PATENT DOCUMENTS

| CN | 105628561 A | 6/2016 |
| CN | 105675452 A | 6/2016 |
| WO | 2018109319 A1 | 6/2018 |

OTHER PUBLICATIONS

Maurizio Santini, "X-ray computed microtomography for drop shape analysis and contact angle measurement", Jun. 26, 2013 (Year: 2013).*
Rajneesh Bhardwaj, "Analysis of an Evaporating Sessile Droplet on a Non-Wetted Surface", p. 50, Apr. 25, 2018 (Year: 2018).*

(Continued)

*Primary Examiner* — Maurice C Smith
(74) *Attorney, Agent, or Firm* — Cantor Colburn LLP; Joseph Petrokaitis

(57) ABSTRACT

Provided are embodiments for a system for determining wettability of fluid-fluid-solid systems. The system includes a confocal optical microscope and a storage medium, the storage medium being coupled to a processor. The processor is configured to perform a scan of a sample of a multi-phase system using the confocal optical microscope, wherein a phase defines a structural phase of matter, identify each phase of the sample, and measure a three-phase contact line for the sample, wherein the three-phase contact line is along an interface of first fluid and a second fluid and an interface of a second fluid and solid. The processor is configured to obtain one or more characteristics from the sample based at least in part on the three-phase contact line, and provide the one or more characteristics for the sample. Also provided are embodiments for a method for determining the wettability of fluid-fluid-solid systems.

20 Claims, 9 Drawing Sheets

(56) References Cited

OTHER PUBLICATIONS

Panagiotis E. Theodorakis, "Modelling the superspreading of surfactant-laden droplets with computer simulation", The Royal Society of Chemistry 2015 (Year: 2015).*

Berger et al., "A Survey of Surface Reconstruction from Point Clouds", Computer Graphics Forum, 1981, 27 pages.

Disclosed Anonymously, "Systems and methods for measuring surface contact angles", IP.com No. IPCOM000239761D, Publication Date: Dec. 1, 2014, 8 pages.

Sewall et al, "Machine learning based hyperspectral image analysis: A Survey" 2018, 42 pages.

Giro et al., "Adsorption energy as a metric for wettability at the nanoscale", Scientific Reports, 2017, 8 pages.

Magalhaes, et al., "Fast exact parallel 3D mesh intersction algorithm using only orientation predicates", ACM ISBN, 2017, 11 pages.

Schmatz et al., "Nanoscale imaging of porescale fluid-fluid-solid contacts in sandstone", Geophysical research letters, 42(7), pp. 2189-2195, 2015.

Sezgin et al., "Survey over image thresholding techniques and quantitative performance evaluation", Journal of Electronic Imaging 13 (1), pp. 146-165, Jan. 2004.

Tarabalka et al., "Segmentation and classification of hyperspectrial images using minimum spanning forest grown from automatically selected markers", Hal, 2010, 14 pages.

Tarabalka, et al., "Segmentation and classification of hyperspctral images using watershed transformation" Hal, 2010, 40 pages.

Thomas Moller, "A First Triangle-Triangle Intersection Test", 1997, 5 pages.

Velankar, "A non-equilibrium state diagram for liquid/fluid/particle mixtures", Soft Matter, 11(43), pp. 8393-8403, 2015.

Yeh et al., "A Comparison of Machine Learning Methods on Hyperspectral Plant Disease Assessments", Department of Bio-Industrial Mechatronics Engineering, 2013, 5 pages.

* cited by examiner

DETERMINING WETTABLITY CHARACTERISTICS OF A FLUID-FLUID-SOLID SAMPLE

BACKGROUND

The present invention generally relates to using computing systems and measurement tools to determine three-phase system characteristics, and more specifically to a computer-implemented methods and computer systems configured and arranged to determine the wettability of fluid-fluid-solid systems.

Wettability is a property that describes the bonding or adherence of two materials. For example, wettability describes the ability of a fluid to maintain contact with a solid surface. The wettability typically is represented by the contact angle which can be measured from a sample to determine the degree the fluid is wetting the solid surface. The contact angle is often used to quantify the wettability providing a concrete physical representation of the wettability. As the conditions of a solution or mixture change the contact angle changes based on the intermolecular interactions between the fluid and solid. This can be useful for applications such as fossil fuel recovery, semiconductor manufacturing, agriculture, food and beverage, textile, metal processing and printing industries to name a few. When a first and second fluid comes into contact with a surface, the contact angle is established which is an indicator of the wettability characteristics. The contact angle provides one of many ways to quantify the wettability of a fluid.

SUMMARY

Embodiments of the present invention are directed to a method for determining the wettability of fluid-fluid-solid systems. A non-limiting example of the method includes performing, by a measuring device, a scan of a sample of a multi-phase system, wherein a phase defines a structural phase of matter, identifying each phase of the sample, and measuring a three-phase contact line for the sample, wherein the three-phase contact line is along an interface of first fluid and a second fluid and an interface of a second fluid and solid. The method also includes obtaining, by a computing device, one or more characteristics from the sample based at least in part on the three-phase contact line, and providing, by the computing device, the one or more characteristics for the sample.

Embodiments of the present invention are directed to a system for determining the wettability of fluid-fluid-solid systems. A non-limiting example of the system includes a confocal optical microscope and a storage medium, the storage medium being coupled to a processor. The processor is configured to perform a scan of a sample of a multi-phase system using the confocal optical microscope, wherein a phase defines a structural phase of matter, identify each phase of the sample, and measure a three-phase contact line for the sample, wherein the three-phase contact line is along an interface of first fluid and a second fluid and an interface of a second fluid and solid. The processor is configured to obtain one or more characteristics from the sample based at least in part on the three-phase contact line, and provide the one or more characteristics for the sample.

Embodiments of the invention are directed to a computer program product for determining the wettability of fluid-fluid-solid systems, the computer program product comprising a computer readable storage medium having program instructions embodied therewith. The program instructions are executable by a processor to cause the processor to perform a method. A non-limiting example of the method includes controlling an optical microscope to perform a scan of a sample of a multi-phase system, wherein a phase defines a structural phase of matter, identifying each phase of the sample, and measuring a three-phase contact line for the sample, wherein the three-phase contact line is along an interface of first fluid and a second fluid and an interface of a second fluid and solid. The method also includes obtaining, by a computing device, one or more characteristics from the sample based at least in part on the three-phase contact line, and providing, by the computing device, the one or more characteristics for the sample.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

Figure 1:
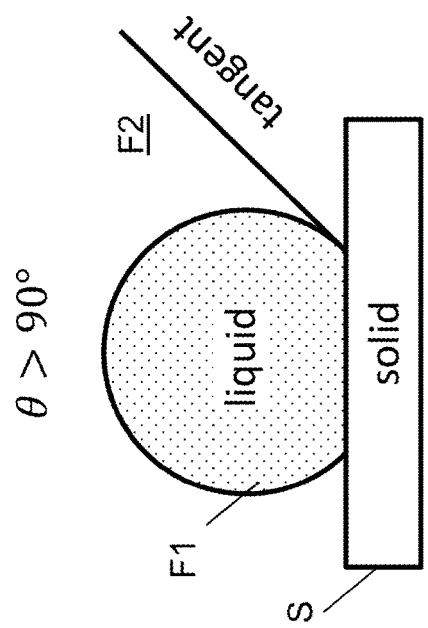
FIG. 1 depicts a droplet illustrating a low wettability characteristic for the solid sample.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that are more specifically relevant to aspects of the invention, the wettability property of fluids is used to provide useful information in a variety of applications. Wettability is the degree with which fluids maintain contact with a solid surface. Wettability results from the molecular interactions between the fluids and the solid. The wettability of the system can be determined by measuring a contact angle between the fluid-fluid interface and the fluid-solid interface which is impacted by balancing the adhesive and cohesive forces in the system. That is, as the tendency for a droplet to spread over a solid surface increases, the contact angle decreases. Therefore, the contact angle provides an indication of the wettability characteristic of the fluid.

In order to change the contact angle, a fluid having known properties can be introduced into the mixture to increase/decrease the wettability characteristic to obtain the desired qualities for the droplet.

Figure 2:
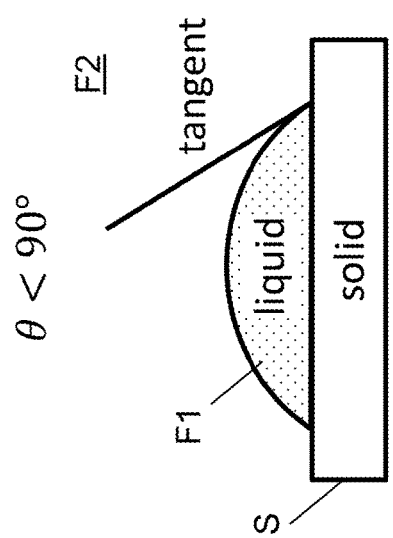
FIG. 2 depicts a droplet illustrating a high wettability characteristic for the solid sample.
Figure 3:
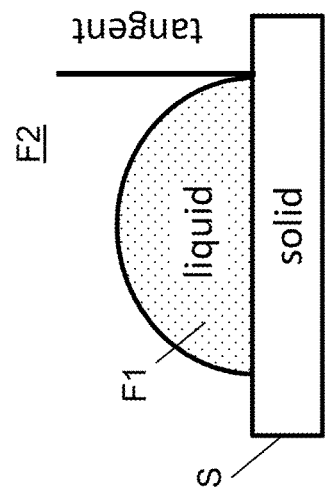
FIG. 3 depicts a droplet illustrating a neutral wettability characteristic for the sample.

With reference to FIGS. 1-3, the contact angle is typically used at the figure-of-merit for wettability. A droplet of fluid 1 (F1) is dispersed in fluid 2 (F2) which is in contact with a solid surface (S). The shape of the F1-F2 interface and the manner in which it intersects with the solid interface determines the wettability characteristic of the three-phase system (F1-F2-S). The contact angle is often measured from a side perspective of the droplet using an examination microscope. Different types of microscopes can be used to analyze and measure the contact angle formed by the droplet. It is further analyzed to determine the three-phase contact line using analog or digital methods.

FIG. 1 depicts a first fluid F1, a second fluid F2, and a solid surface S. The contact angle of the tangent line between the F1-F2 interface and the solid surface S as shown in FIG. 1 is greater than 90 degrees. In this scenario, it is said the fluid F1 has a low wettability characteristic. FIG. 2 depicts a first fluid F1, a second fluid F2, and a solid surface S. The contact angle of the tangent line between the F1-F2 interface and the solid surface S as shown in FIG. 2 is less than 90 degrees. In this scenario, it is said the fluid F1 has a high wettability characteristic. FIG. 3 depicts the contact angle F1-F2 intersects S at a right angle, where in this scenario the system is said to be neutrally wet.

However, the above techniques are limited to fluid F2 existing in the gaseous phase. That is, the existing techniques are limited to analyzing liquid droplets in vapor/gas setting. In addition, existing techniques obtain 2D silhouettes of the sample where the 2D nature of the acquired data oversimplifies the wetting behavior of most three-phase systems by assuming symmetries where none exist. As shown in each of the FIGS. 1-3, the sample is assumed to be a spherical cap. This occurs when performing the contact angle analysis using traditional techniques.

Turning now to an overview of the aspects of the invention, one or more embodiments of the invention address the above-described shortcomings of the prior art by providing techniques to determine the wetting properties of fluid-fluid-solid systems in a variety of scenarios. For example, a scenario can include a first fluid that is in a liquid phase, a second fluid contacting the first fluid that is in either gas or liquid phase, regardless of which fluid (F1 or F2) is denser. Also, the techniques provide the ability to determine wetting properties for a fluid interface that is or is not assumed to be a spherical cap, where the fluid interface is not symmetric with respect to any plane or axis.

The contact angle will be measured by an examination microscope. The contact angle is measured optically by taking a sideways-perspective image of the droplet sample and analyzing the three-phase contact line.

The above-described aspects of the invention address the shortcomings of the prior art by implementing a method and system that leverages tomography to perform measurements to obtain a number of wettability characteristics.

Figure 4A:
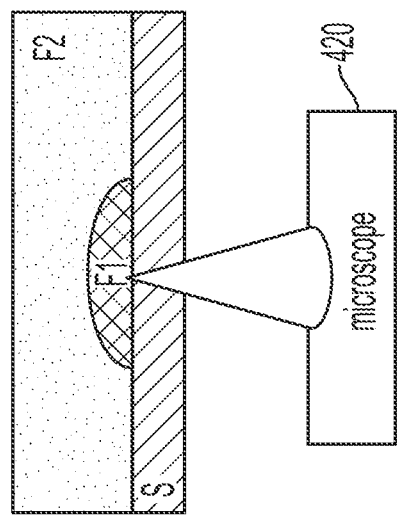
FIG. 4A depicts an arrangement of obtaining scans and measurements for the 3-phase system where the measuring device is arranged above the sample.
Figure 4B:
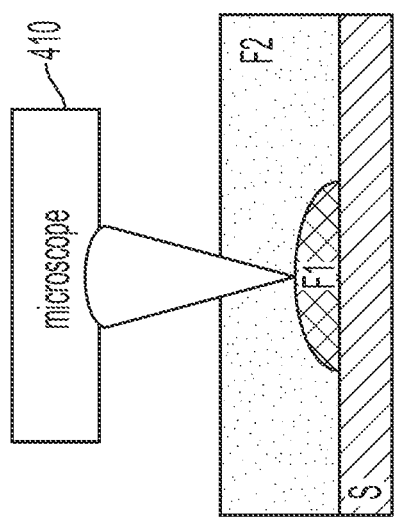
FIG. 4B depicts a different arrangement of obtaining scans and measurements for the 3-phase system where the measuring device is arranged below the sample.

Turning now to a more detailed description of aspects of the present invention, FIGS. 4A and 4B depict various examination techniques that can be used to analyze samples in accordance with one or more embodiments of the invention. FIG. 4A illustrates a sample F1, wherein the sample contains a 3-phase sample F1 (fluid-fluid-S. FIG. 4A depicts a droplet F1, a second fluid F2, and a solid surface S. The microscope 410 is positioned above the sample and is configured to focus on different depths of the sample F1 to obtain a plurality of scans of the sample. After obtaining the plurality of scans, the individual images are combined to form a 3D image of the sample. The 3D imaging of the sample F1 allows an accurate representation of the sample that can be used to perform the measurement. The droplet is no longer assumed to be a spherical cap as in conventional techniques. Although the droplet sample F1 is shown as a spherical cap in FIGS. 4A and 4B, this is only an illustrative example and is not intended to limit the capability of the techniques provided herein.

In one or more embodiments of the invention, the measurements and scans can be obtained using a confocal laser scanning microscope attached to a spectroscopic unit which allows for the spectral analysis of the light emanating from the position of the laser focus. In some embodiments of the invention, the measurements and scans are obtained using a confocal microscope attached to a camera unit that allows for capturing light emanating from the focus plane.

FIG. 4B provides an inverted arrangement where the microscope 420 is positioned below the sample. In FIG. 4B, the solid S is transparent which enables the microscope 420 to obtain a number of scans and measurements of the sample F1.

Figure 5:
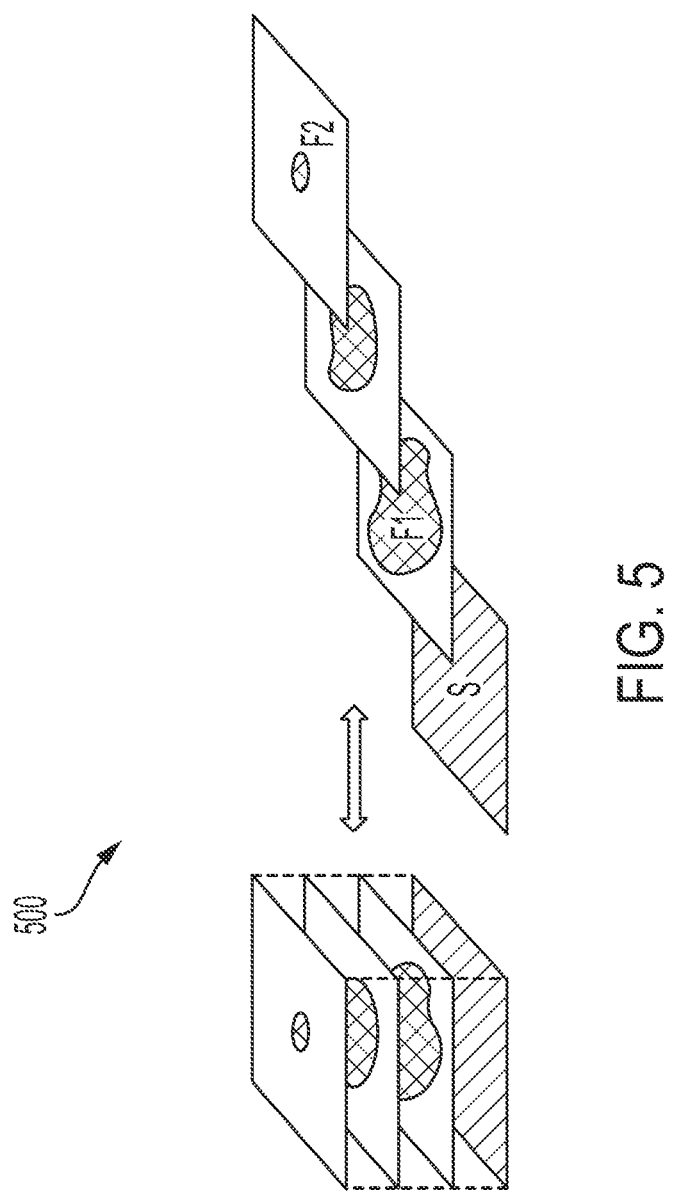
FIG. 5 depicts a number of scans that have been obtained by a microscope, composing a three-dimensional image.

FIG. 5 depicts a number of scans 500 that have been obtained from sample, such as the sample F1 shown in FIGS. 4A and 4B. The bottom most layer as shown is the solid portion of the 3-phase system. The microscope can begin the scanning procedure at the bottom most layer and then continue to measure the additional layers of the sample to obtain a full set of images for the sample. As shown, the sample/droplet is not a perfect sphere which is assumed when using traditional techniques. Because an accurate depiction of the system is obtained by the microscope a better measurement for the contact angle can be obtained by using the techniques described herein. Each of the layers can be combined and used to obtain a 3D representation of the 3-phase system. It should be understood that the four layers shown in FIG. 5 are only an example and any number of scans can be obtained by the microscope or scanning device to obtain a 3D rendering of the sample. In addition, it should be understood the sample can also be scanned from a top-down approach instead of a bottom-up approach as described.

Figure 6:
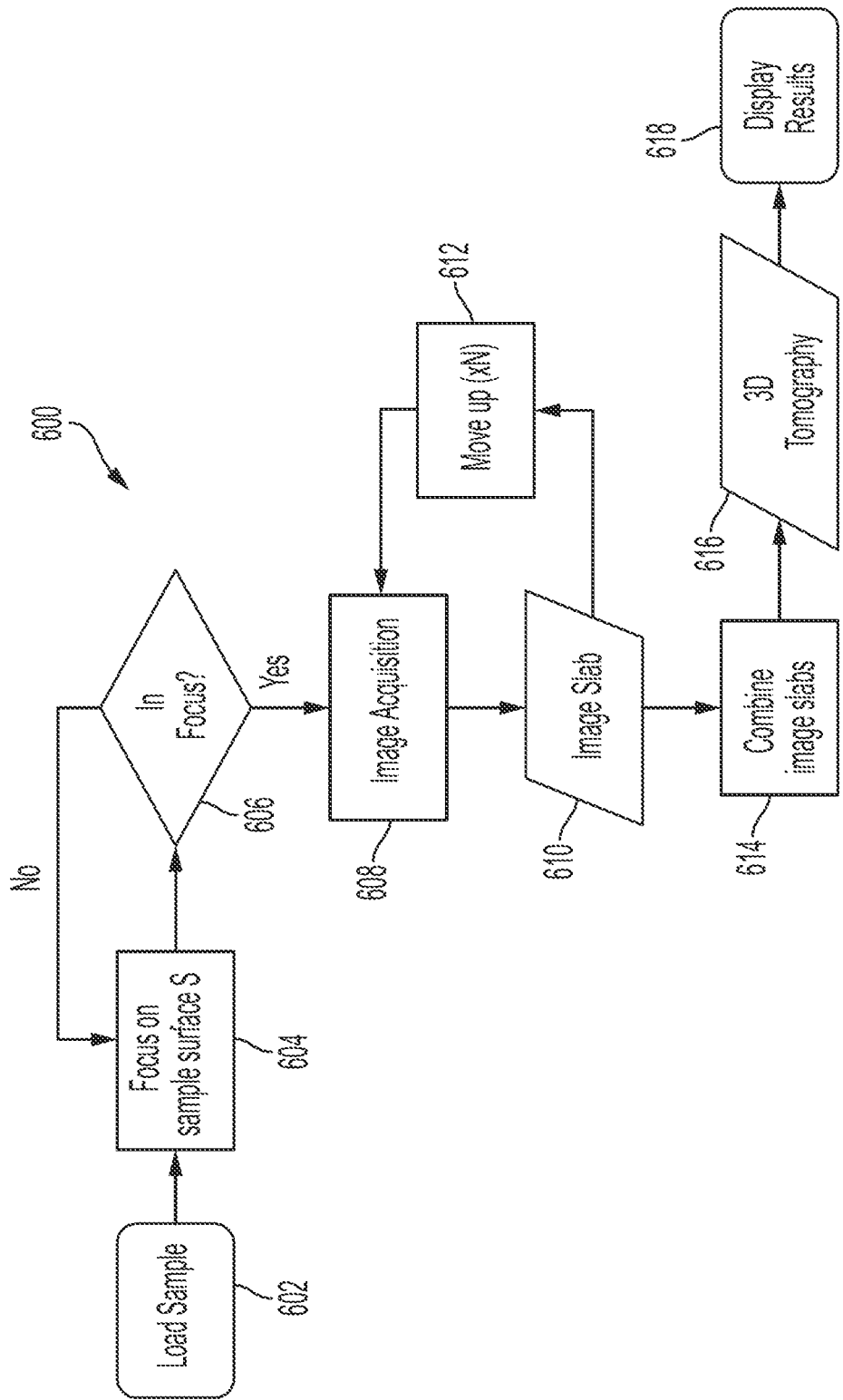
FIG. 6 depicts a flow chart of a method for acquiring the data required for determining the wettability of fluid-fluid-solid systems in accordance with one or more embodiments of the invention.
Figure 8:
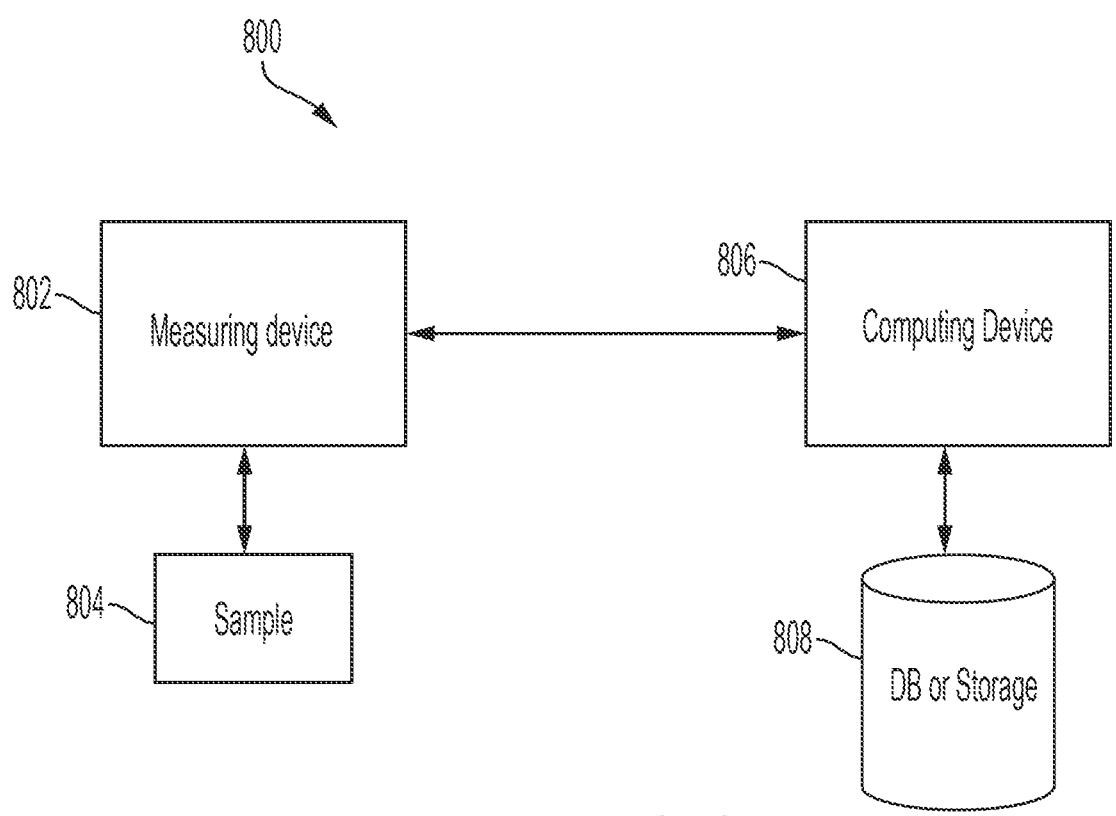
FIG. 8 depicts an example system in accordance with one or more embodiments of the invention.

Now referring to FIG. 6, a flowchart of a method 600 in accordance with one or more embodiments of the invention is shown. The process begins at block 602 where a sample is loaded onto a microscope for examination. In one or more embodiments of the invention, the microscope can be the measure device 802 as shown in FIG. 8. At block 604 the microscope focuses on a surface S of the sample and proceeds to block 606 to determine whether the microscope is in focus on the particular layer. If so ("Yes" branch), the method 600 proceeds to block 608. Otherwise ("No" branch), the method 600 returns to block 604 to attempt to re-focus the microscope on the surface of the sample. After acquiring the image at block 608, a plurality of image slabs is obtained from the sample at block 610. In one or more embodiments of the invention, the plurality of image slabs are provided to a computing device 806 which is used to further process the image slabs. The image acquisition is repeated, as shown at block 612, until the complete sample has been acquired layer-by-layer. At block 614 the plurality of image slabs are combined to form the 3D tomography (block 616). That is, the computing device 806 further processes the plurality of image slabs to form the 3D tomography. At block 618, the results can be displayed on a display for inspection. For example, the results can be displayed on a display on the computing device 806 or the results can be transmitted and displayed on different display device.

Figure 7:
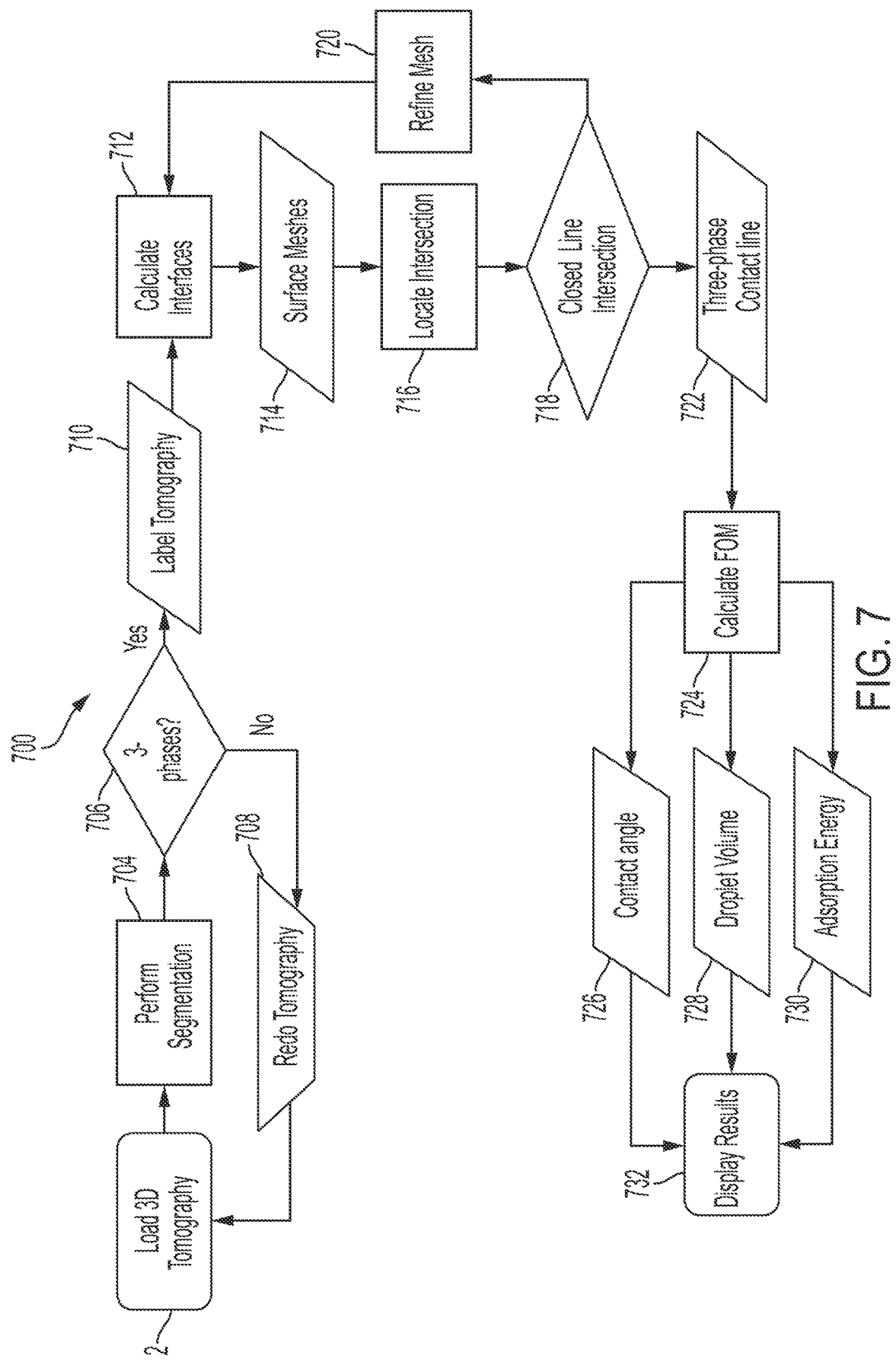
FIG. 7 depicts a flow chart of a method for processing the data required for determining the wettability of fluid-fluid-solid systems in accordance with one or more embodiments of the invention.

Now referring to FIG. 7, a flowchart of a method 700 in accordance with one or more embodiments of the invention is shown. The method 700 begins by loading the tomography to obtain data from the sample as shown at block 702. In one or more embodiments of the invention, the optical tomography is loaded into a computing device 806 such as that shown in FIG. 8 using a digital file representing the tomography. The digital tomography may consist of an image dataset containing a set of voxels (volume pixels) arranged in three-dimensional space. Each voxel in the image can hold a number, a color, or intensity, which depends on the interaction between the light beam and the material in the corresponding region of space when using a single-wavelength light beam. Each voxel in the image may hold an array of numbers, spectrum with peaks and valleys, that depend of the interaction between the light beam and the material in the corresponding region of space when using a multiple-wavelength light beam. Each voxel in the image may hold several arrays of numbers (several spectra) that depend of the interaction between each light beam and the material in the corresponding region of space when using several multiple-wavelength light beams. Non-limiting examples of techniques to obtain the voxel representations can include laser confocal scanning microscopy, fluorescence microscopy, digital microscopy, spectral imaging, multispectral imaging, hyperspectral imaging, snapshot hyperspectral imaging, Raman spectrum, fluorescence spectrum, etc.

The method 700 proceeds to block 704 which provides for performing a segmentation of the tomography. That is, the optical tomography is analyzed by the computing device 806 to determine whether multiple classes are present in the sample where the class can correspond to the structural phases of matter. The multi-class segmentation algorithms that can be used based on the voxel representations. For example, if the image is acquired with a single wavelength, the color, intensity, and texture of the voxels, the segmentation algorithm that is used can include multi-threshold Otsu, K-means clustering, region-growing, artificial neural networks, watershed, etc. If the image was acquired with a single spectrum, the segmentation may be performed using known lookup tables for material spectra, machine-learning models trained using the lookup tables (hyperspectral watershed transformation, minimum spanning forest, etc.). If the image was acquired with multiple spectra (Raman, fluorescence, etc.), the segmentation may be performed using machine learning models trained on the known spectra for each material. In one or more embodiments of the invention, at block 706 if the distinct phases cannot be identified in the segmentation step by the computing device 806, the tomography should be re-acquired as shown at block 708 with higher contrast by optimizing the choice of light beam wavelengths. In a different embodiment of the invention, other contrast agents (e.g., fluorescent particles) can be used to better distinguish the phases in the sample when obtaining the images using the measuring device 802. The method 700, at block 710 labels the tomography to identify a liquid phase, gas phase, and/or solid phase. It should be understood that both fluids F1 and F2 can exist in the liquid state. The method 700 proceeds to block 712 and the computing device 806 calculates the interfaces between each of the phases of the sample. For example, the F1-S interface, the F2-S interface, and the F1-F2 interfaces are determined for the sample. The interface determination techniques can include adjusting a polygon surface mesh in 3D to a point cloud, adjusting a mode surface fit using a complete function basis set (e.g., Bessel functions), or any other suitable numerical interface identification algorithm including but not limited to marching cubes/tetrahedral, Canny filter, level-set method, etc.

At block 714, the method 700 a surface mesh is applied to the tomography. In one or more embodiments of the invention, the surface mesh can include a polygon surface mesh which can be applied in 3D and may be adjusted to the point cloud. The intersection between each of the interfaces is located at block 716. At decision block 718, if it is determined that the intersection line is not closed, the mesh can be refined as shown in block 720, and recalculates the interfaces and returns to block 712.

At block 722, the computing device 806 identifies a three-phase contact line in the tomography. Block 724 provides for calculating figures-of-merit (FOM) from the two-phase interfaces and three-phase contact line. The FOM includes but is not limited to the contact angle (F1-F2-S), the contact line (F1-F2-S), the contact area (F2-S), the interface area (F1-F2), the droplet shape (F2), the droplet curvature (F2), the droplet height (F2), the droplet radius (F2), the droplet volume (F2), etc. In one or more embodiments of the invention, the droplet contact angle (Block 726) may be obtained by calculating the normal vectors of the F1-F2 surface close to the contact line. The droplet volume (Block 728) may be obtained by calculating the volume enclosed by the surfaces F1-F2 and F1-S. The absorption energy (Block 730) density may be obtained by including bulk, surface and line energy contributions. Finally, the data can be displayed on the computing device 806 or other display as shown at block 732.

FIG. 8 depicts an example system 800 including a computing device that is operably coupled to the microscope. The measuring device 802, such as an optical microscope, is used to analyze the sample 804 which it loaded onto the measuring device 802. The measuring device 802 is coupled to a computing device 806. The computing device 806 can be implemented as discussed below with reference to FIG. 9. The measuring device 802 and computing device 806 are configured to communicate and exchange data to obtain a 3D representation of the sample. The data obtained from the measuring device 802 and the computing device 806 can be stored in the DB 808.

Figure 9:
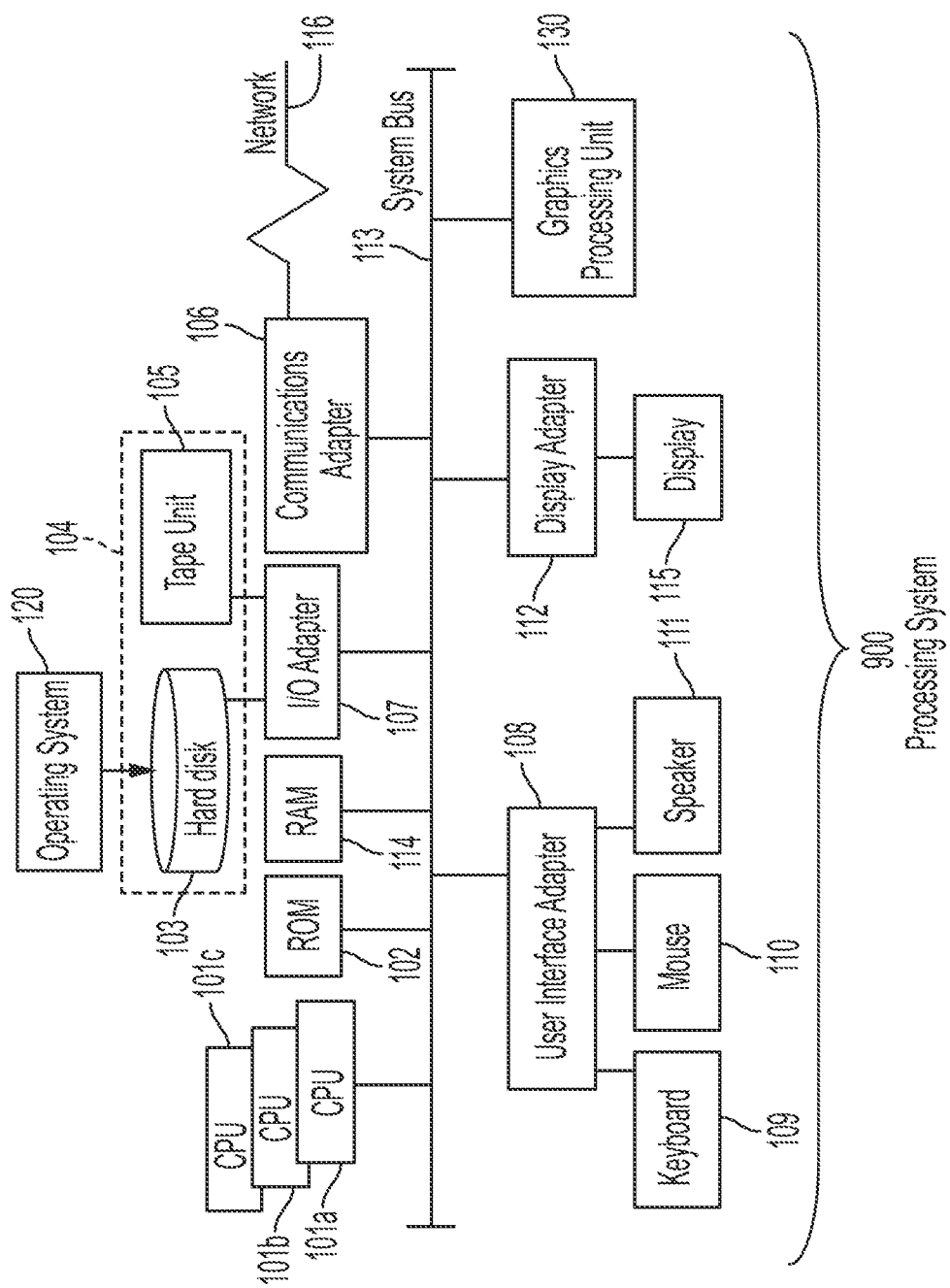
FIG. 9 depicts block diagram illustrating one example of a processing system for practice of the teachings herein.

Referring to FIG. 9, there is shown an embodiment of a processing system 900 for implementing the teachings herein. In this embodiment, the system 900 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 900.

FIG. 9 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 900 may be stored in mass storage 104. A network adapter 106 interconnects bus 113 with an outside network 116 enabling data processing system 900 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 900 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing, and has a highly parallel structure that makes it more effective than general-purpose CPUs for algorithms where processing of large blocks of data is done in parallel.

Thus, as configured in FIG. 9, the system 900 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 9.

The techniques described herein improve over the prior art by allowing the wettability characteristic to be determined for a three-phase system including fluid-fluid-solid systems, regardless of the relative densities of the two fluids. Using the techniques described herein allow for the wettability to be determined for a liquid-liquid-solid system, instead of being limited to a liquid-gas-solid system. In addition, the techniques described herein allow not only obtaining the droplet silhouette, but also obtain the 3D droplet topography and the three-phase contact line simultaneously. The techniques using optical microscopy collect data in each voxel. Thus, if the spectroscopy is performed at a range of wavelengths (such as infra-red, Raman, UV-Vis), then it is possible to identify if there are contaminants into F1 of F2 or over the surface S which could change the wettability.

The technical benefits and effects include a device that performs optical tomography (3D imaging) and a method that extracts accurate droplet shapes and three-phase contact geometry from the tomography to determine wetting properties of fluid-fluid-solid systems as disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for determining wettability of fluid-fluid-solid systems, the computer-implemented method comprising:
performing, by a measuring device, a scan of a sample of a multi-phase system, wherein a phase defines a structural phase of matter, wherein the sample comprises a first fluid in a liquid phase, a second fluid in a liquid or gas phase, and a solid, wherein the first fluid generating a droplet in the sample;
identifying each phase of the sample;
measuring a three-phase contact line for the sample, wherein the three-phase contact line is along a two-phase interface between the first fluid and the second fluid, a two-phase interface between the first fluid and the second fluid, and a two-phase interface between the second fluid and the solid;
obtaining, by a computing device, one or more figures-of-merit from the sample based at least in part on the three-phase contact line and each of the two-phase interfaces; and
providing, by the computing device, the one or more figures-of-merit from the sample.

2. The method of claim 1, further comprising loading a digital file representing a digital tomography of the scan, wherein the digital tomography comprising an image dataset containing a set of voxel arranged in three-dimensional space.

3. The method of claim 1, wherein the measuring device is a confocal optical microscope, wherein the scan of the sample collects spectroscopic data over one electromagnetic wavelength or a set of electromagnetic wavelengths.

4. The method of claim 1, wherein identifying each phase of the sample comprises:
performing a multi-phase segmentation process of the sample to obtain its three phases; and
labeling each of the three phases of the sample.

5. The method of claim 1 further comprising re-performing the scans responsive to not being able to identify each phase in the sample.

6. The method of claim 1, wherein determining the three-phase line further comprises:
calculating two-phase interfaces of the multiple phase system, wherein each of the two-phase interfaces include a set of points between neighboring voxels assigned to each of the three phases;
applying surface meshes between each of the two-phase interfaces;
locating intersections between each of the two-phase interfaces; and
refining the surface meshes.

7. The method of claim 6, wherein the one or more figures-of-merit for the sample comprise a contact angle, a droplet volume, and an absorption energy that are based at least in part on the measured three-phase contact line, wherein the three-phase contact line is defined as a set of points and line segments that belong to each of the surface meshes representing the two-phase interfaces.

8. A system for determining wettability of fluid-fluid-solid systems, the system comprising:
a camera;
a confocal optical microscope coupled to the camera;
a storage medium, the storage medium being coupled to a processor;
the processor configured to:
perform a scan of a sample of a multi-phase system using the confocal optical microscope, wherein a phase defines a structural phase of matter, wherein the sample comprises a first fluid in a liquid phase, a second fluid in a liquid or gas phase, and a solid, wherein the first fluid forms a droplet in the sample;
identify each phase of the sample;
measure a three-phase contact line for the sample, wherein the three-phase contact line is along a two-phase interface between the first fluid and the second fluid, a two-phase interface between the first fluid and the second fluid, and a two-phase interface between the second fluid and the solid;
obtain one or more figures-of-merit from the sample based at least in part on the three-phase contact line and each of the two-phase interfaces; and
provide the one or more figures-of-merit from the sample.

9. The system of claim 8, wherein the processor is further configured to load a digital file representing a digital tomography of the scan, wherein the digital tomography comprising an image dataset containing a set of voxel arranged in three-dimensional space.

10. The system of claim 8, wherein the processor is configured to control the confocal optical microscope to collect spectroscopic data over one electromagnetic wavelength or a set of electromagnetic wavelengths.

11. The system of claim 8, wherein identifying each phase of the sample comprises the processor configured to:
perform a multi-phase segmentation process of the sample to obtain three phases; and
label each of the three phases of the sample.

12. The system of claim 11, wherein the processor is further configured to re-perform the scans responsive to not being able to identify each phase in the sample.

13. The system of claim 8, wherein determining the three-phase line further comprises the processor being configured to:
calculate two-phases interfaces of the multiple phase system, wherein each of the two-phase interfaces include a set of points between neighboring voxels assigned to each of the three phases;
apply surface meshes between each of the two-phase interfaces;
locate intersections between each of the two-phase interfaces; and
refine the surface meshes.

14. The system of claim 13, wherein the one or more figures-of-merit for of the sample comprise a contact angle, a droplet volume, and an absorption energy that are based at least in part on the measured three-phase contact line, wherein the three-phase contact line is defined as a set of points and line segments that belong to each of the surface meshes representing the two-phase interfaces.

15. A computer program product for determining wettability of fluid-fluid-solid systems, the computer program product comprising a computer-readable storage medium having program instructions embodied therewith, the program instructions executable by a processor to cause the processor to:

control an optical microscope to perform a scan of a sample of a multi-phase system, wherein a phase defines a structural phase of matter, wherein the sample comprises a first fluid in a liquid phase, a second fluid in a liquid or gas phase, and a solid, wherein the first fluid forms a droplet in the sample;

obtain, using a camera, the scan of the sample;

identify each phase of the sample;

measure a three-phase contact line for the sample, wherein the three-phase contact line is along a two-phase interface between the first fluid and the second fluid, a two-phase interface between the first fluid and the second fluid, and a two-phase interface between the second fluid and the solid;

obtain one or more figures-of-merit from the sample based at least in part on the three-phase contact line and each of the two-phase interfaces; and provide the one or more figures-of-merit for the sample.

16. The computer program product of claim 15, wherein the program instructions are further executable by the processor to cause the processor to load a digital file representing a digital tomography of the scan, wherein the digital tomography comprising an image dataset containing a set of voxel arranged in three-dimensional space.

17. The computer program product of claim 15, wherein the program instructions are further executable by the processor to cause the processor to control the optical microscope to collect spectroscopic data over one electromagnetic wavelength or a set of electromagnetic wavelengths.

18. The computer program product of claim 15, wherein identifying each phase of the sample the program instructions are further executable by the processor to cause the processor to:

perform a multi-phase segmentation process of the sample to obtain its three phases;

label each of the three phases of the sample; and re-perform the scans responsive to not being able to identify each of the three phases in the sample.

19. The computer program product of claim 15, wherein determining the three-phase line the program instructions are further executable by the processor to cause the processor to:

calculate two-phase interfaces of the multiple phase system, wherein each of the two-phase interfaces include a set of points between neighboring voxels assigned to each of the three phases;

apply surface meshes between the each of the two-phase interfaces;

locate intersections between each of the two-phase interfaces; and refine the surface meshes.

20. The computer program product of claim 19, wherein the one or more figures-of-merit for the sample comprise a contact angle, a droplet volume, and an absorption energy that are based at least in part on the measured three-phase contact line, wherein the three-phase contact line is defined as a set of points and line segments that belong to each of the surface meshes representing the two-phase interfaces.

* * * * *